US012266894B2

(12) United States Patent
Hibino et al.

(10) Patent No.: US 12,266,894 B2
(45) Date of Patent: Apr. 1, 2025

(54) FEMALE CONNECTOR MODULE AND CONNECTOR ASSEMBLY

(71) Applicant: SUMITOMO WIRING SYSTEMS, LTD., Mie (JP)

(72) Inventors: Takuma Hibino, Mie (JP); Jumpei Kawahara, Mie (JP); Harald Michael Lutsch, Ottrau (DE)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 415 days.

(21) Appl. No.: 17/894,876

(22) Filed: Aug. 24, 2022

(65) Prior Publication Data

US 2023/0068157 A1 Mar. 2, 2023

(30) Foreign Application Priority Data

Aug. 30, 2021 (JP) ................................ 2021-140438

(51) Int. Cl.
*H01R 13/506* (2006.01)
*H01R 13/6584* (2011.01)
*H01R 13/6598* (2011.01)

(52) U.S. Cl.
CPC ....... *H01R 13/6584* (2013.01); *H01R 13/506* (2013.01); *H01R 13/6598* (2013.01)

(58) Field of Classification Search
CPC .............. H01R 13/506; H01R 13/6584; H01R 13/6598; H01R 2105/00; H01R 24/568; H01R 9/0518
See application file for complete search history.

(56) References Cited

U.S. PATENT DOCUMENTS

| | | | | |
|---|---|---|---|---|
| 7,677,936 | B2 * | 3/2010 | Sato | H01R 13/506 439/892 |
| 9,379,494 | B1 * | 6/2016 | Hu | H01R 24/64 |
| 9,954,318 | B2 * | 4/2018 | Lee | H01R 13/659 |
| 10,439,331 | B2 * | 10/2019 | Maesoba | H01R 13/6581 |
| 2009/0093170 | A1 * | 4/2009 | Shinkawa | H01R 9/0527 439/733.1 |
| 2013/0303015 | A1 * | 11/2013 | Oka | H01R 9/0518 439/374 |
| 2019/0157809 | A1 * | 5/2019 | Maesoba | H01R 24/50 |
| 2021/0399441 | A1 * | 12/2021 | Ohfuku | H01R 13/6593 |

* cited by examiner

*Primary Examiner* — Abdullah A Riyami
*Assistant Examiner* — Thang H Nguyen
(74) *Attorney, Agent, or Firm* — Venjuris, P.C.

(57) ABSTRACT

A female connector module to be connected to a male terminal module is provided with a tubular female shield member, a tubular housing arranged on an outer periphery of the female shield member, a front mask provided on a tip portion of the housing, and an electrically conductive rubber for conduction between a male shield member of the male terminal module and the female shield member. The front mask has an end wall for facing an end surface of the housing and a side wall for covering an outer peripheral surface of the tip portion. The end wall has a through hole into which the male terminal module being inserted. The electrically conductive rubber is so arranged inside the through hole as to contact an end surface of the female shield member while being held in contact with an outer peripheral surface of the male shield member.

10 Claims, 11 Drawing Sheets

FEMALE CONNECTOR MODULE AND CONNECTOR ASSEMBLY

CROSS-REFERENCE TO RELATED APPLICATIONS

This application is based on and claims priority from Japanese Patent Application No. 2021-140438, filed on Aug. 30, 2021, with the Japan Patent Office, the disclosure of which is incorporated herein in its entirety by reference.

TECHNICAL FIELD

The present disclosure relates to a female connector module and a connector assembly.

BACKGROUND

Japanese Patent Laid-open Publication No. 2018-006183 discloses a shield connector including a shield terminal and a housing. The shield terminal includes an inner conductor, a dielectric arranged on the outer periphery of the inner conductor and an outer conductor arranged on the outer conductor of the dielectric. The outer conductor is a shield member for shielding electromagnetic waves. The outer conductor is a pressed article formed, such as by bending an electrically conductive metal plate. The shield terminal is accommodated in the housing.

SUMMARY

In the case of connecting two shield connectors including shield terminals, the following configuration is generally adopted to ensure conduction between a male shield member and a female shield member in the two shield connectors. In this configuration, at least one of the male shield member and the female shield member is a pressed article as disclosed in Japanese Patent Laid-open Publication No. 2018-006183 and includes a spring mechanism.

However, gaps may be formed by the bending of a metal plate or the like in the pressed article including the spring mechanism. These gaps cause the leakage of electromagnetic waves and reduce shielding performance. To fill up the gaps, it is necessary to apply complicated bending or the like, which reduces productivity.

One object of the present disclosure is to provide a female connector module and a connector assembly capable of ensuring conduction between a male shield member and a female shield member by a simple configuration.

This object is solved according to the invention by the features of the independent claims. Particular embodiments of the invention are subject of the dependent claims.

The present disclosure is directed to a female connector module to be connected to a male terminal module, comprising: a female shield member; a housing arranged on an outer periphery of the female shield member; a front mask provided on a tip portion of the housing; and an electrically conductive rubber for conduction between a male shield member of the male terminal module and the female shield member, wherein: (i) the front mask has an end wall for substantially facing an end surface of the housing and at least one side wall for at least partly covering an outer peripheral surface of the tip portion, (ii) the end wall has a through hole, the male terminal module being insertable into the through hole, and (iii) the electrically conductive rubber at least partly is so arranged inside the through hole as to contact the female shield member while being held in contact with the male shield member.

According to a particular embodiment, the electrically conductive rubber at least partly is so arranged inside the through hole as to contact an end surface of the female shield member while being held in contact with an outer peripheral surface of the male shield member.

Particularly, the female shield member is a substantially tubular female shield member and/or wherein the housing is a tubular housing.

Further particularly, there is disclosed a female connector module to be connected to a male terminal module and provided with a tubular female shield member, a tubular housing arranged on an outer periphery of the female shield member, a front mask provided on a tip portion of the housing, and an electrically conductive rubber for conduction between a male shield member of the male terminal module and the female shield member, wherein the front mask has an end wall for facing an end surface of the housing and a side wall for covering an outer peripheral surface of the tip portion, the end wall has a through hole, the male terminal module being inserted into the through hole, and the electrically conductive rubber is so arranged inside the through hole as to contact an end surface of the female shield member while being held in contact with an outer peripheral surface of the male shield member.

According to a further aspect, the present disclosure is directed to a connector assembly with a male terminal module and a female connector module to be connected to the male terminal module, wherein the male terminal module includes a male shield member, and the female connector module is the female connector module of the present disclosure.

A female connector module according to a particular embodiment of the present disclosure is a female connector module to be connected to a male terminal module and provided with a tubular female shield member, a tubular housing arranged on an outer periphery of the female shield member, a front mask provided on a tip portion of the housing, and an electrically conductive rubber for conduction between a male shield member of the male terminal module and the female shield member, wherein the front mask has an end wall for facing an end surface of the housing and a side wall for covering an outer peripheral surface of the tip portion, the end wall has a through hole, the male terminal module being inserted into the through hole, and the electrically conductive rubber is so arranged inside the through hole as to contact an end surface of the female shield member while being held in contact with an outer peripheral surface of the male shield member.

In the female connector module of the present disclosure, conduction between the female shield member and the male shield member is ensured by the electrically conductive rubber. The electrically conductive rubber is arranged inside the through hole, into which the male terminal module is inserted, in the front mask, and has a simple configuration. By arranging the electrically conductive rubber inside the through hole, the entire periphery of the electrically conductive rubber serves as a contact region with the male shield member and the conduction is satisfactorily ensured.

In the female connector module of the present disclosure, since the conduction is ensured by the electrically conductive rubber, it is not necessary to form each of the male shield member and the female shield member into a pressed article and to provide a spring mechanism in the pressed article. Thus, in the female connector module of the present disclosure, gaps are unlikely to be formed on both the male shield member and the female shield member and a reduction in shielding performance is suppressed.

As one aspect of the female connector module of the present disclosure, the female shield member is a cast body.

Gaps are unlikely to be formed on the peripheral surface of the female shield member constituted by the cast body and shielding performance is excellent.

As one aspect of the female connector module of the present disclosure, the front mask includes at least one fixing portion for fixing the front mask to the housing with the end surface of the female shield member pressed against the electrically conductive rubber.

In the above aspect, a contact state of the female shield member and the electrically conductive rubber is satisfactorily ensured and the conduction between the male shield member and the female shield member is satisfactorily ensured.

As one aspect of the female connector module of the present disclosure, the fixing portion includes at least one projection to be fit to or engage the housing.

In the above aspect, the front mask can be easily fixed to the housing.

As one aspect of the female connector module of the present disclosure, the electrically conductive rubber comprises (particularly is) an injection molded body configured integrally to the front mask.

In the above aspect, the front mask and the electrically conductive rubber can be handled as an integrated object.

As one aspect of the female connector module of the present disclosure, the electrically conductive rubber is arranged to at least partly cover a peripheral region of an opening edge part of the through hole on an inner surface of the end wall and a peripheral region of the opening edge part of the through hole on an outer surface of the end wall.

By arranging the electrically conductive rubber to at least partly cover the peripheral region of the opening edge part of the through hole on the inner surface of the end wall, the electrically conductive rubber easily contacts the end surface of the female shield member. By arranging the electrically conductive rubber to cover the peripheral region of the opening edge part of the through hole on the outer surface of the end wall, an axial length of the electrically conductive rubber is easily secured and a contact area of the electrically conductive rubber and the male shield member is easily ensured.

A connector assembly according to an embodiment of the present disclosure is provided with a male terminal module, and a female connector module to be connected to the male terminal module, wherein the male terminal module includes a male shield member, and the female connector module is the female connector module according to any one of the aspects described above.

The connector assembly of the present disclosure can ensure conduction between the male shield member and the female shield member by a simple configuration by including the female connector module of the present disclosure. Since the connector assembly of the present disclosure includes the female connector module of the present disclosure, it is not necessary to form each of the male shield member and the female shield member into a pressed article and to provide a spring mechanism in the pressed article. Thus, in the connector assembly of the present disclosure, gaps are unlikely formed on both the male shield member and the female shield member and a reduction in shielding performance is suppressed.

As one aspect of the connector assembly of the present disclosure, the male shield member comprises (particularly is) a composite material having a plating layer on a surface of a resin material, an electrically conductive resin material and/or a cast body.

Gaps are unlikely to be formed on the peripheral surface of the male shield member constituted by a composite material having a plating layer on a surface of a resin material, an electrically conductive resin material or a cast body, and shielding performance is excellent.

The female connector module and the connector assembly of the present disclosure can ensure conduction between the male shield member and the female shield member by a simple configuration.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Specific examples of a female connector module of the present disclosure and a connector assembly of the present disclosure are described below with reference to FIGS. 1 to 11. The same reference signs in figures denote the similar or same components. In each figure, some of components may be shown in an exaggerated or simplified manner for the convenience of description. A dimension ratio of each part in the figures may be different from an actual one. Note that the present invention is not limited to these illustrations and is intended to be represented by claims and include all changes in the scope of claims and in the meaning and scope of equivalents.

SUMMARY

Figure 1:
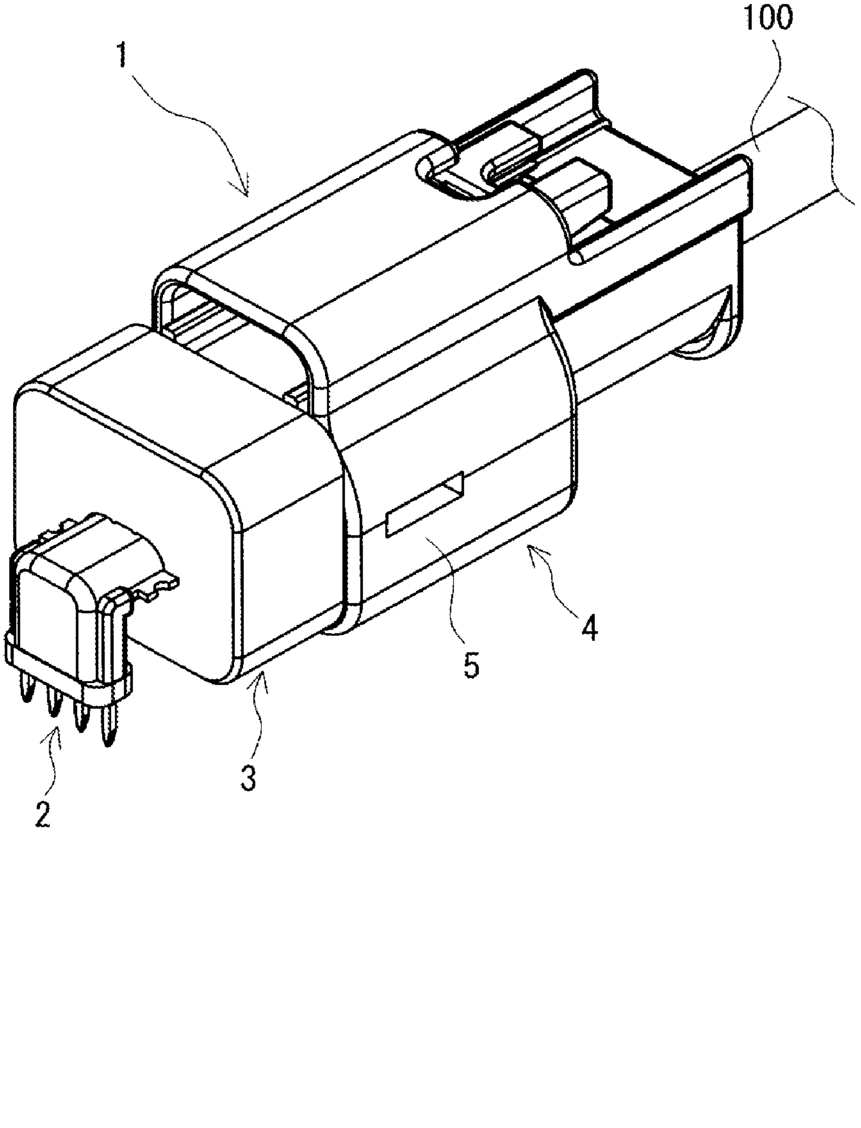
FIG. 1 is a schematic perspective view of a connector assembly of an embodiment.
Figure 3:
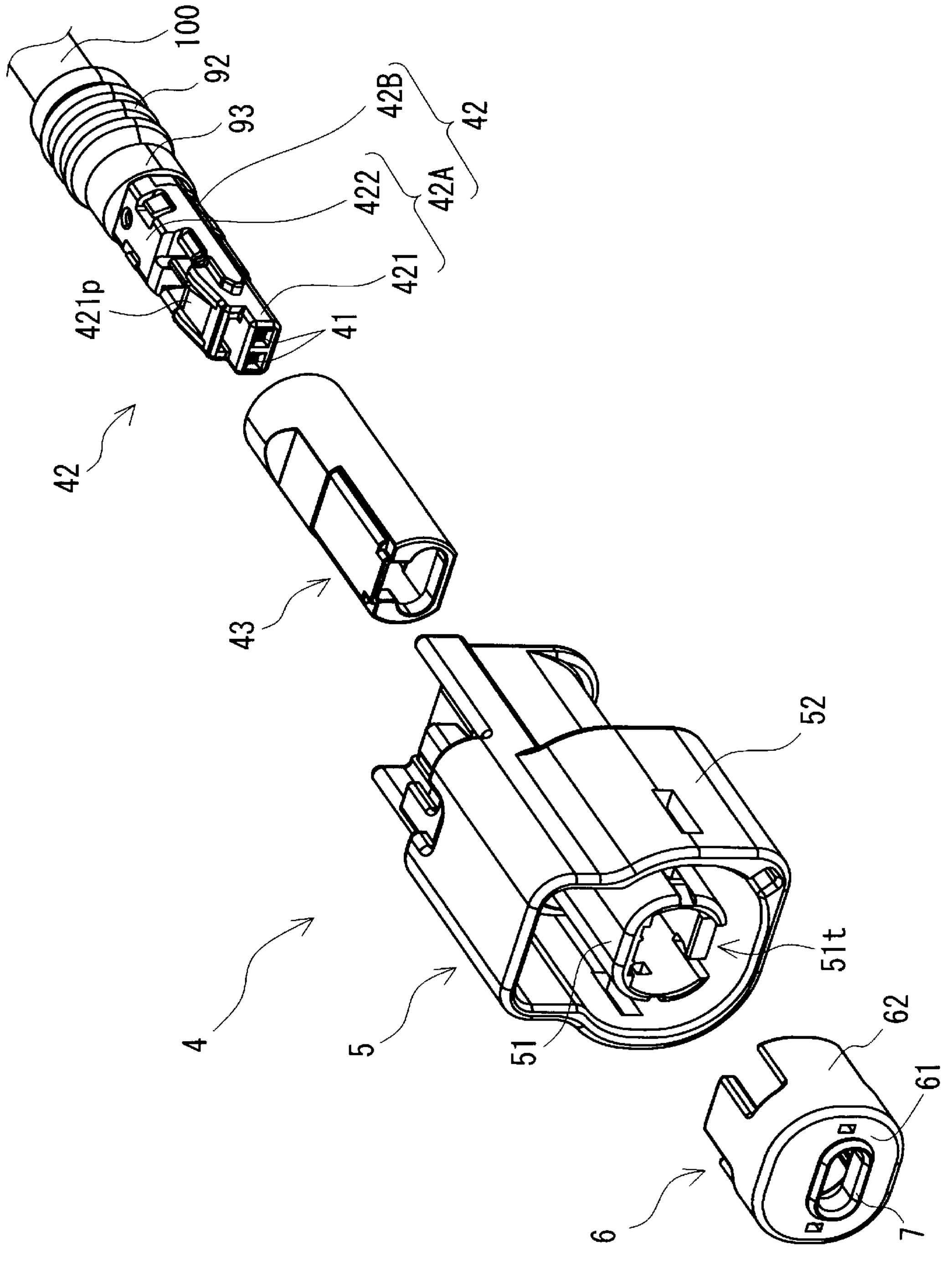
FIG. 3 is a schematic exploded perspective view showing a part of a female connector module of the embodiment in a disassembled state.
Figure 9:
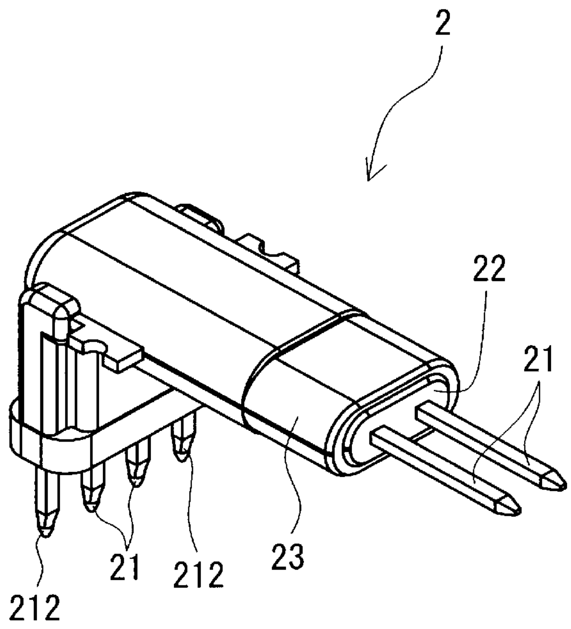
FIG. 9 is a schematic perspective view of a male terminal module in the connector assembly of the embodiment.
Figure 11:
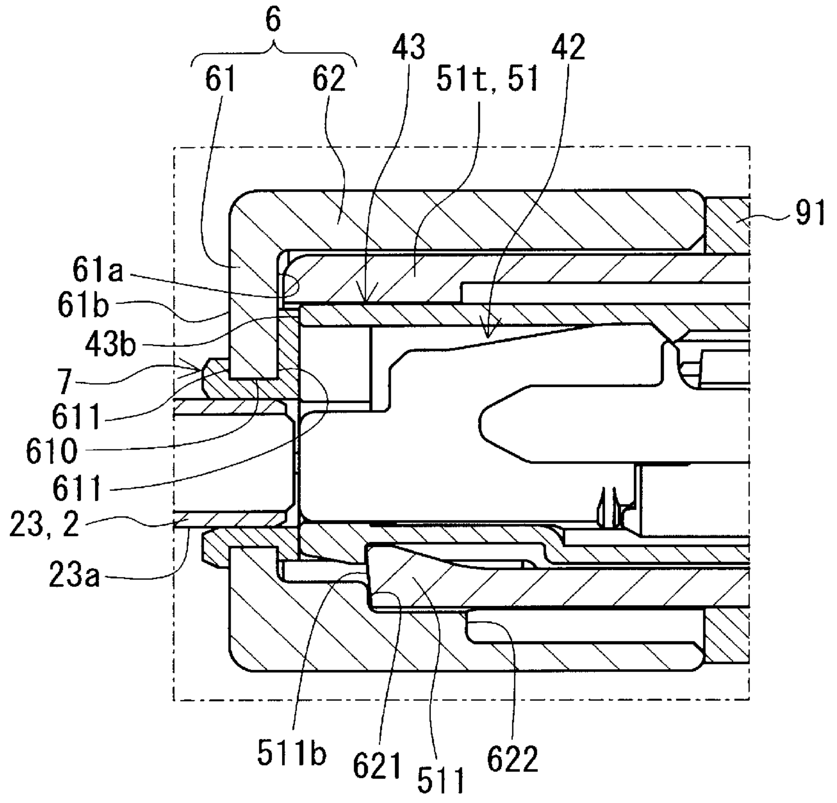
FIG. 11 is a schematic enlarged section enlargedly showing a conduction part between a male shield member and a female shield member in the connector assembly of the embodiment.

A connector assembly 1 of an embodiment includes at least one male terminal module 2 and at least one female connector module 4 to be connected to the male terminal module 2 as shown in FIG. 1. As shown in FIG. 9, the male terminal module 2 includes at least one male shield member 23. As shown in FIG. 3, the female connector module 4 includes at least one female shield member 43. One feature of the connector assembly 1 of the embodiment is that conduction between the male shield member 23 and the female shield member 43 is ensured at least by an electrically conductive rubber 7 (as shown in FIG. 11), particularly when the female connector module 4 is properly connected with the male terminal module 2. The female connector module 4 of the embodiment includes the electrically conductive rubber 7 capable of ensuring the above conduction. The female connector module 4 is mounted or mountable on or to (particularly the tip or end portion of) a communication cable 100. The communication cable 100 is first summarized and, thereafter, the configuration of the female connector module 4 and that of the male terminal module 2 are described.

Figure 4:
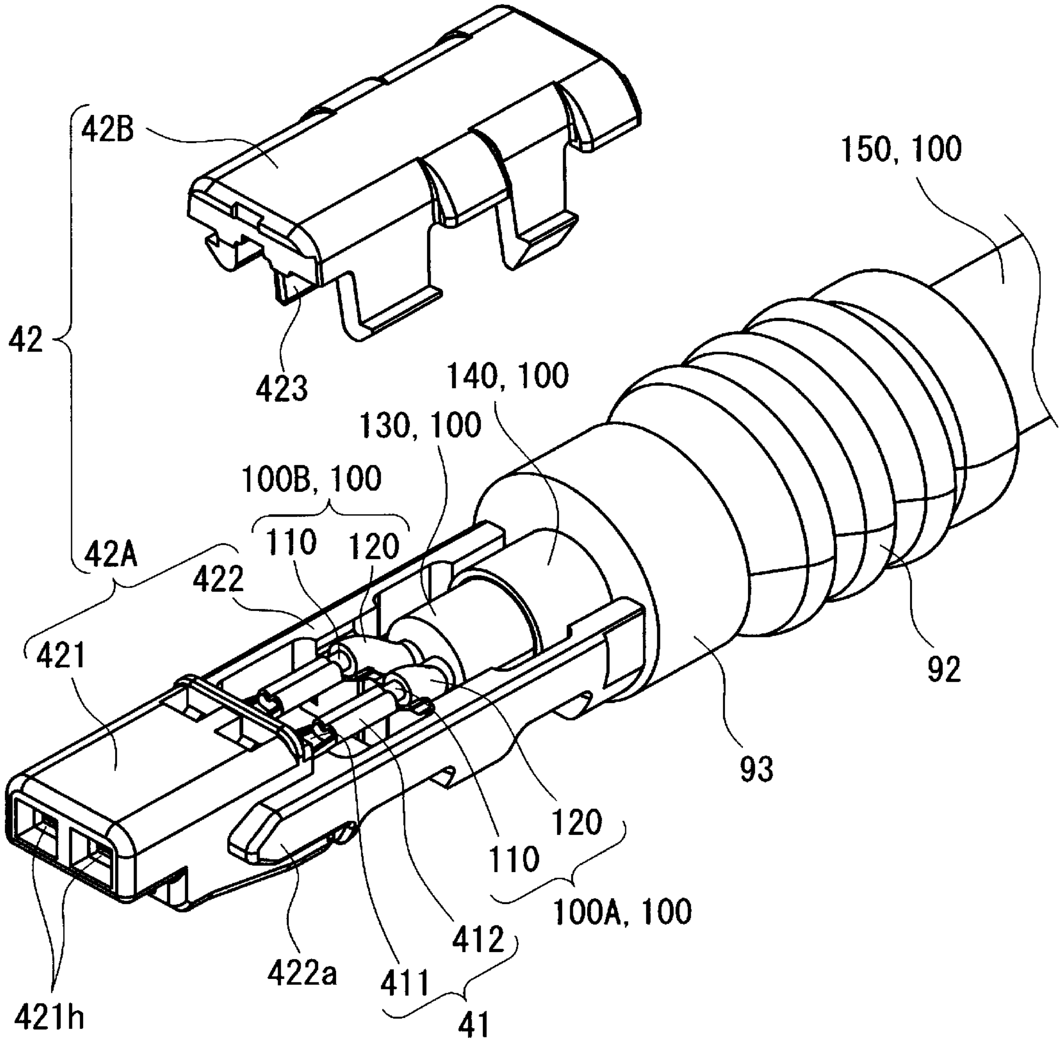
FIG. 4 is a schematic exploded perspective view showing a connector member in the female connector module of the embodiment in a disassembled state.

FIG. 1 shows the connector assembly 1 in a state where the male terminal module 2 and the female connector module 4 are connected. The male terminal module 2 and a housing 3 constitute at least part of a male connector. The housing 3 at least partly is inserted or insertable into a housing 5 of the female connector module 4. Although described in detail later, the female connector module 4 of this example includes one or more (e.g. two) female terminals 41 as shown in FIGS. 3 and 4. In the following description, an arrangement direction of the plurality of (e.g. two) female terminals 41 is referred to as a lateral direction. A direction substantially orthogonal to both a connecting direction of the male terminal module 2 and the female connector module 4 shown in FIG. 2 and the lateral direction is referred to as a vertical direction.

Figure 2:
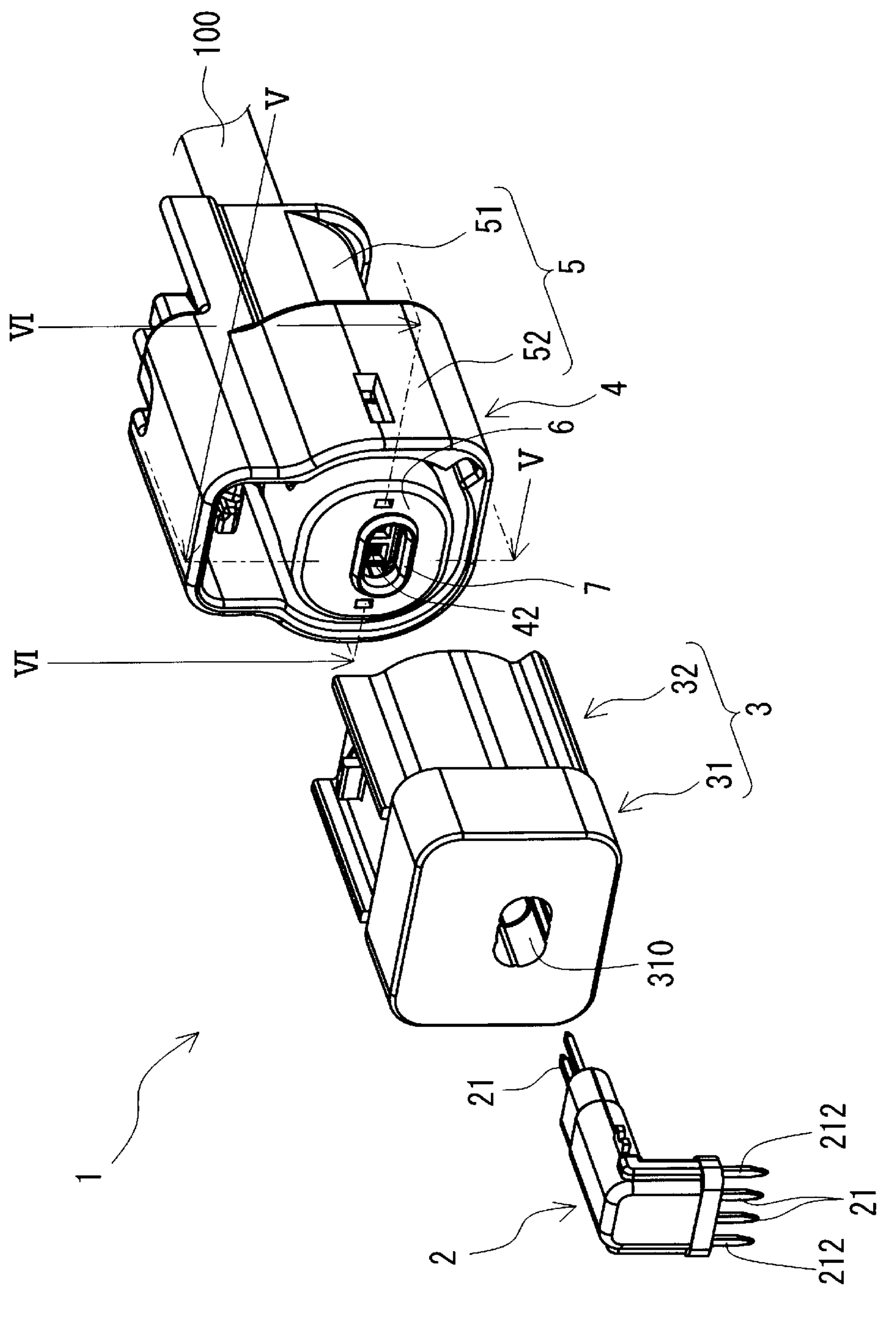
FIG. 2 is a schematic exploded perspective view showing a part of the connector assembly of the embodiment in a disassembled state.
Figure 5:
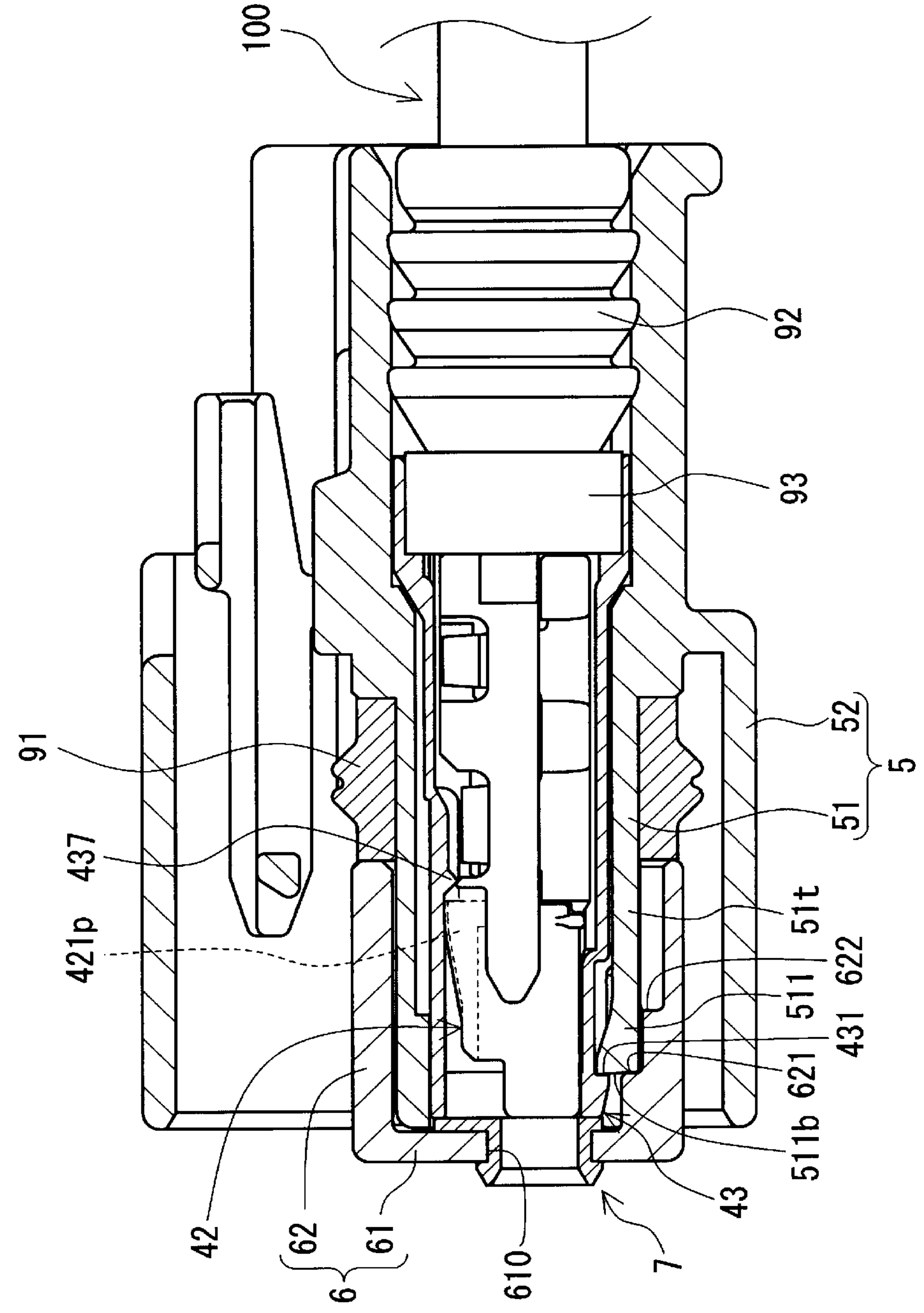
FIG. 5 is a section along V-V of FIG. 2.
Figure 6:
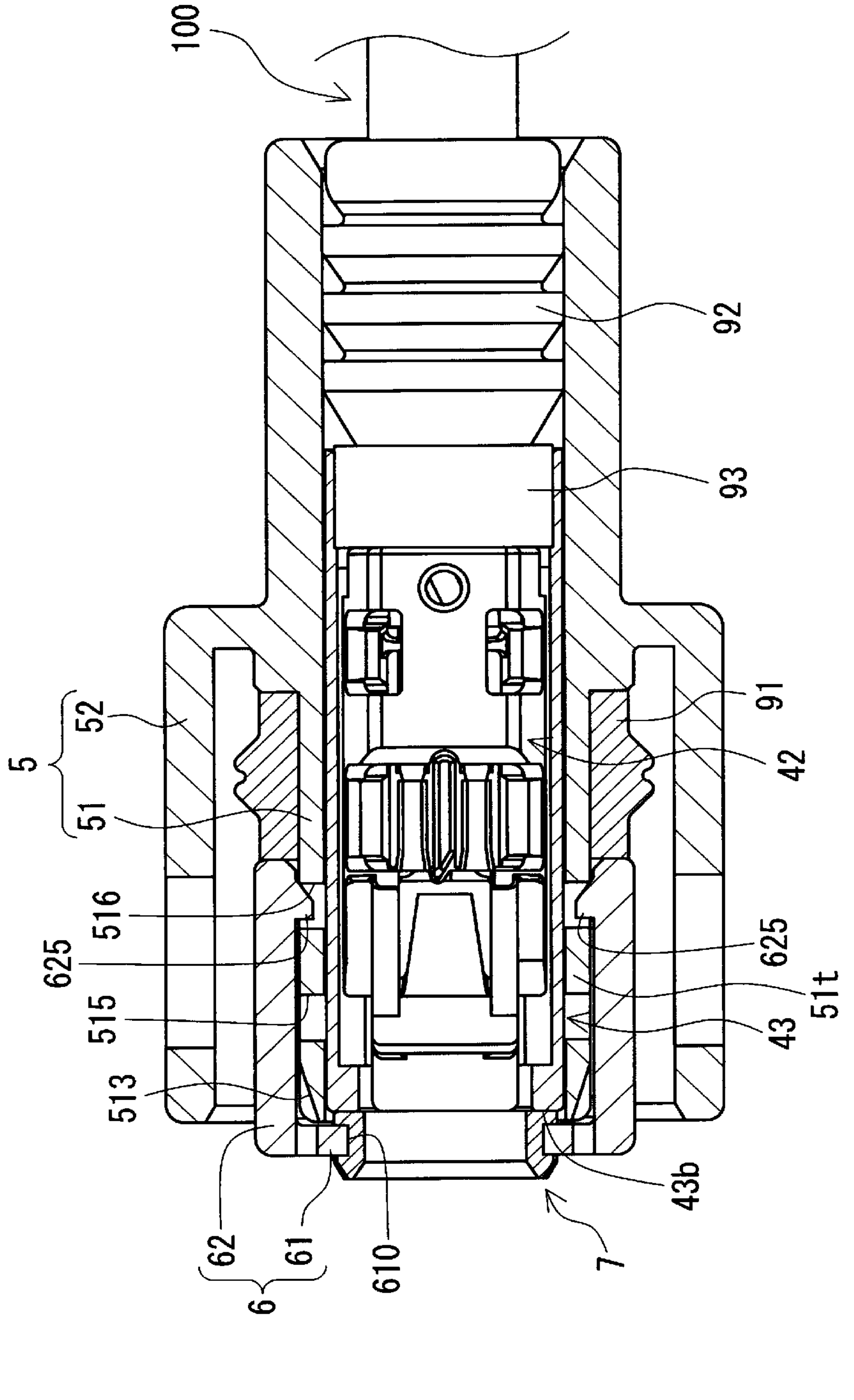
FIG. 6 is a section along VI-VI of FIG. 2.
Figure 7:
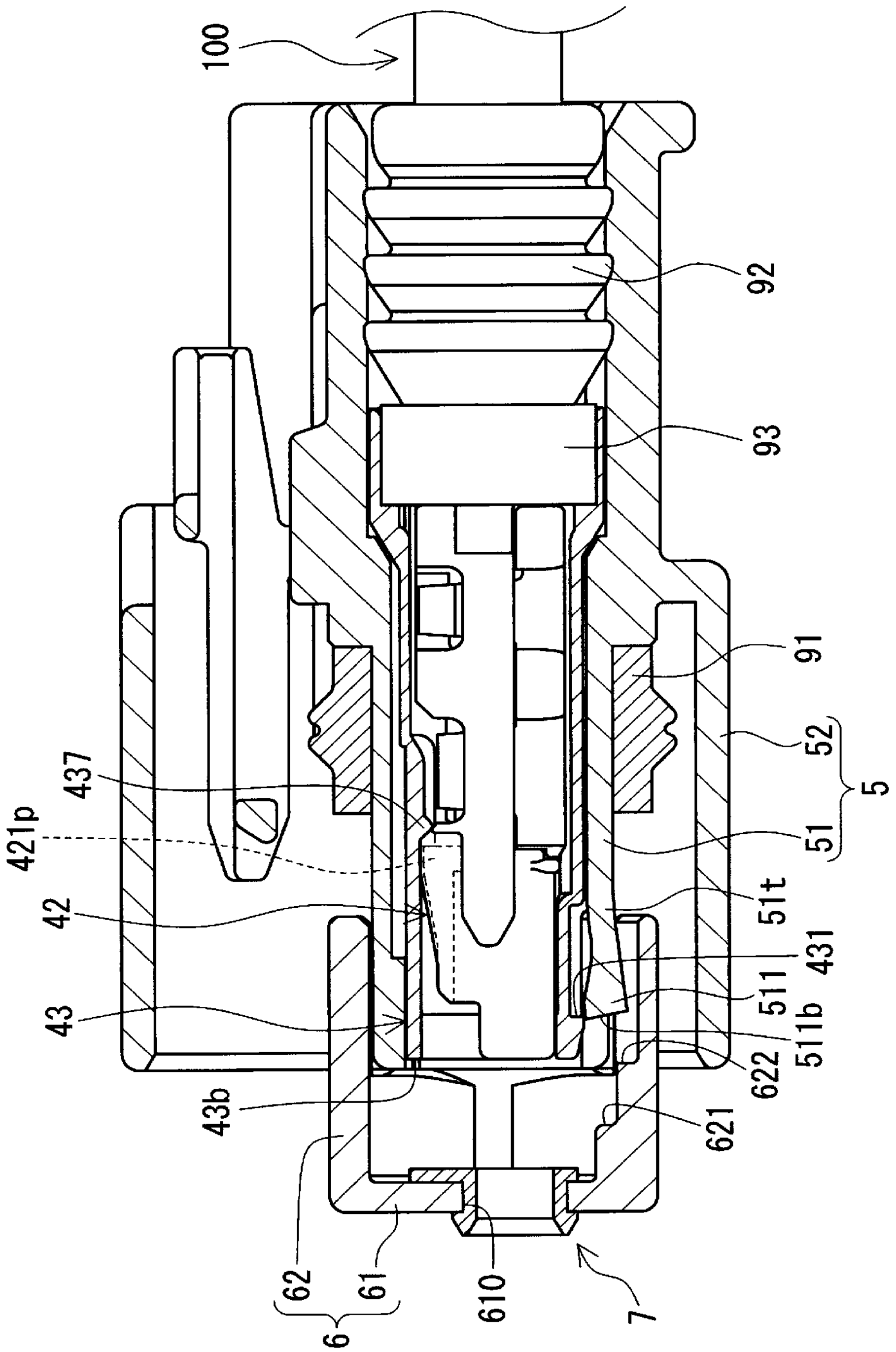
FIG. 7 is a section showing a partially locked state of a housing and a front mask in the female connector module of the embodiment.
Figure 8:
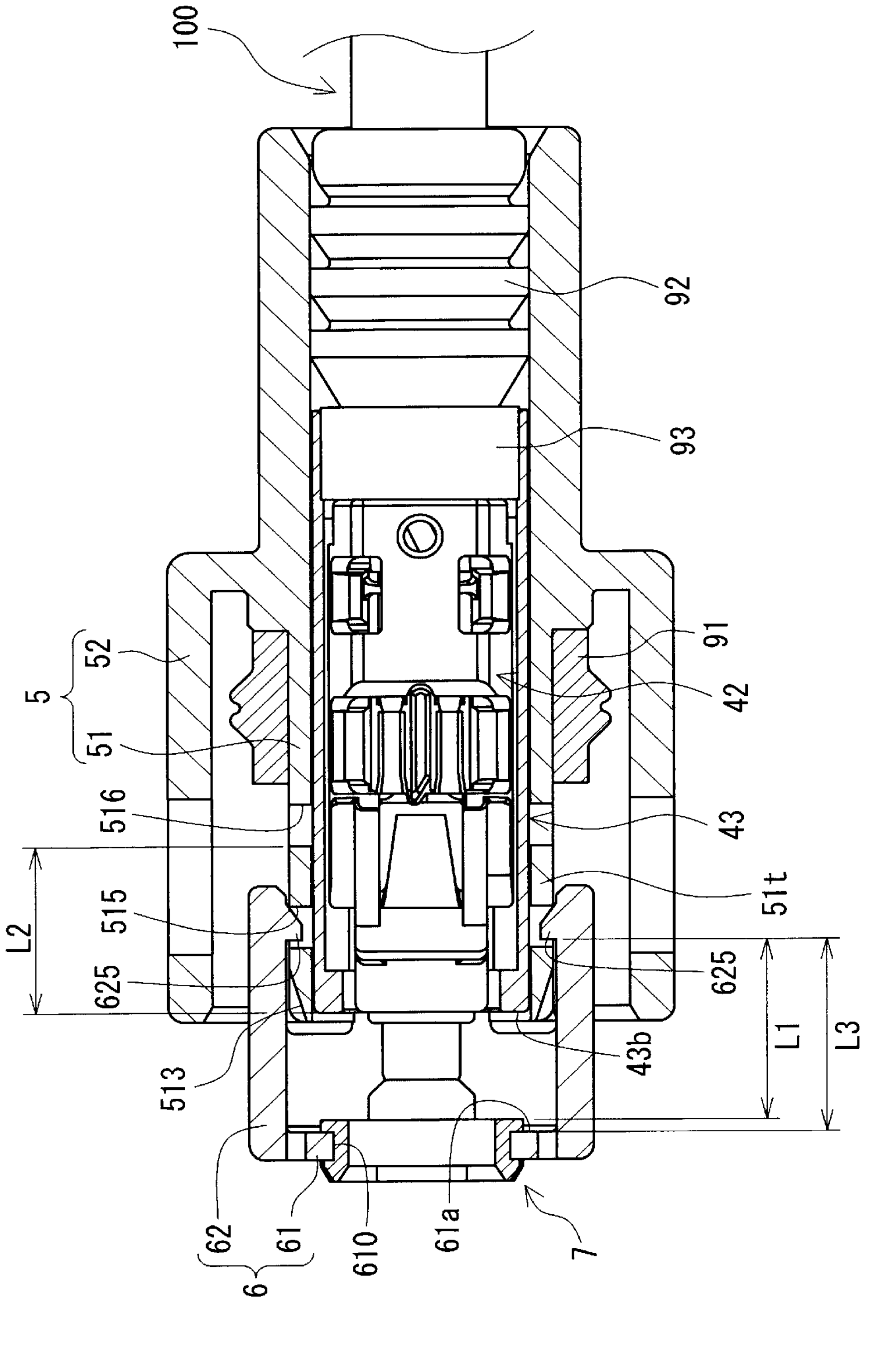
FIG. 8 is another section showing the partially locked state of the housing and the front mask in the female connector module of the embodiment.

FIG. 2 shows a disassembled state of the male terminal module 2, the housing 3 and the female connector module 4 in the connector assembly 1. FIG. 3 shows a disassembled state of a first intermediate component obtained by assembling the one or more female terminals 41 and a connector member 42, the female shield member 43, the housing 5 and a second intermediate component obtained by assembling a front mask 6 and the electrically conductive rubber 7. The first intermediate component is located on a rightmost side of FIG. 3. The second intermediate component is located on a leftmost side of FIG. 3. FIG. 5 shows the female shield member 43, the housing 5, the front mask 6, the electrically conductive rubber 7 and/or a water-stop rubber 91 to be described later in a vertical cross-section cut by a vertical plane passing through a center axis of the housing 5 and the other members in a side surface for the female connector module 4 shown in FIG. 2. FIGS. 7 and 11 also show these as in FIG. 5. The housing 5 and the front mask 6 are in a partially locked state in FIG. 7. FIG. 6 shows the female shield member 43, the housing 5, the front mask 6, the electrically conductive rubber 7 and the water-stop rubber 91 to be described later in a cross-section cut by a horizontal plane passing through the center axis of the housing 5 and the other members in a side surface for the female connector module 4 shown in FIG. 2. FIG. 8 also shows these as in FIG. 6. The housing 5 and the front mask 6 are in the partially locked state in FIG. 8. The communication cable 100 is connected to the female connector module 4 in FIGS. 1 to 8.

<Communication Cable>

The communication cable 100 is, for example, a twisted pair cable satisfying Ethernet (registered trademark) standards. The twisted pair cable is suitable for differential communication hardly affected by noise.

The communication cable 100, which particularly is a twisted pair cable, includes one or more (e.g. two) wires 100A, 100B as shown in FIG. 4. The wire 100A, 100B includes a conductor 110 and a conductor insulation layer 120 arranged on the outer periphery of the conductor 110. The particularly two wires 100A, 100B are, for example, twisted with each other.

The plurality of (e.g. two) wires 100A, 110B are gathered into one by an interposing insulation layer 130.

The communication cable 100 further includes a shield layer 140 at least partly provided on the outer periphery of the interposing insulation layer 130 and/or a sheath 150 specifically at least partly provided on the outer periphery of the shield layer 140. The shield layer 140 is provided to shield electromagnetic waves. The shield layer 140 particularly comprises (is, for example, constituted by) a braided wire of copper, copper alloy, aluminum alloy or the like. Alternatively or additionally, the shield layer 140 may comprise a conductive layer such as a metal layer e.g. of aluminum or aluminum alloy. The sheath 150 is provided to mechanically protect constituent members inside the sheath 150. The sheath 150 particularly is made of insulating resin such as polyvinyl chloride or polyethylene.

An end part of the communication cable 100 is stripped particularly in a stepwise manner. Specifically, in or near the end part of the communication cable 100, the shield layer 140 is exposed from the sheath 150, the interposing insulation layer 130 is exposed from the shield layer 140 and the one or more respective wires 100A, 100B are exposed particularly from the interposing insulation layer 130. The one or more conductors 110 are exposed from the one or more conductor insulation layers 120 in the exposed tips of the one or more respective wires 100A, 100B.

An electrically conductive rubber 93 is arranged on or near the outer periphery of the exposed shield layer 140. The electrically conductive rubber 93 particularly substantially has a tubular shape.

The electrically conductive rubber 93 particularly is to be in close contact with the outer periphery of the shield layer 140 and/or in close contact with the inner peripheral surface of the female shield member 43 to be described later.

The electrically conductive rubber 93 ensures conduction between the shield layer 140 and the female shield member 43.

The wire-stop rubber 92 is arranged on the outer periphery of the sheath 150. The wire-stop rubber 92 particularly substantially has a tubular shape.

The tip of the wire-stop rubber 92 is to be in contact with the electrically conductive rubber 93. One or more, particularly a plurality of annular lips substantially projecting radially outwardly of the wire-stop rubber 92 are provided on (particularly the outer periphery of) the wire-stop rubber 92. The one or more, particularly the plurality of lips particularly are arranged in a direction along an axial direction of the wire-stop rubber 92.

The wire-stop rubber 92 substantially suppresses the intrusion of water from between the communication cable 100 and the housing 5 to be described later.

The wire-stop rubber 92 may be made of an electrically conductive material or may be made of a non-electrically conductive material.

<Female Connector Module>

As shown in FIG. 3, the female connector module 4 includes the one or more female terminals 41, the connector member 42, the female shield member 43, the housing 5, the front mask 6 and/or the electrically conductive rubber 7. In the following description, a side to be connected to the male terminal module 2 is referred to as a tip side and a side to be connected to the communication cable 100 is referred to as a base end side in the female connector module 4.

«Female Terminal(s)»

As shown in FIG. 4, the female terminal 41 includes at least one connecting portion 411 and at least one wire connection portion, particularly comprising at least one wire barrel 412.

A male terminal 21 of the male terminal module 2 to be described later is connected or connectable to the connecting portion 411.

A tip side of the connecting portion 411 particularly substantially is tubular.

The male terminal 21 at least partly is inserted or insertable into (particularly a tubular part of) the connecting portion 411. In this example, the tubular part of the connecting portion 411 substantially has a rectangular tube shape in conformity with the shape of the male terminal 21.

The wire barrel 412 grips or engages the conductor 110 of the communication cable 100.

The female terminal 41 particularly is made of a material excellent in electrical conductivity. For example, copper or copper alloy can be cited as the material of the female terminal 41. Besides, stainless steel can be cited as the material of the female terminal 41.

«Connector Member»

As shown in FIG. 4, the connector member 42 is arranged on (particularly the outer peripheries of) the female terminal(s) 41. The connector member 42 includes a body portion 42A and/or a cover portion 42B. FIG. 4 shows a vertically inverted state of the connector member 42 shown in FIG. 3.

The body portion 42A holds the one or more female terminals 41 connected to the one or more conductors 110.

The body portion 42A includes a connector tube portion 421 and/or a wire holding portion 422. The connector tube portion 421 and the wire holding portion 422 particularly constitute an integrated object.

The connector tube portion 421 is arranged on (particularly a tip side of) the wire holding portion 422. The connector tube portion 421 particularly includes one or more insertion holes 421*h* into which the one or more female terminals 41 at least partly are inserted or insertable.

One female terminal 41 particularly is inserted into one insertion hole 421*h*. In this example, the two insertion holes 421*h* are arranged side by side. The male terminals 21 of the male terminal module 2 to be described later at least partly are inserted or insertable into the insertion holes 421*h*. The female terminals 41 and the male terminals 21 particularly are connected in the insertion holes 421*h*.

As shown in FIG. 3, an inclined portion 421*p* is provided on the upper or outer surface of the connector tube portion 421. The inclined portion 421*p* is inclined radially outwardly of the connector member 42 toward a base end side.

A projection 437 of the female shield member 43 to be described later particularly engages or is hooked to an end surface on the base end side of the inclined portion 421*p* as shown in FIGS. 5 and 7. In FIGS. 5 and 7, a part of the projection 437 and the inclined portion 421*p* are shown in broken lines.

As shown in FIG. 4, the wire holding portion 422 is arranged or arrangeable on the base end side of the connector tube portion 421.

The wire holding portion 422 particularly includes at least one channel portion for substantially holding a region from the shield layer 140 to the conductor insulation layer(s) 120 in the end part of the communication cable 100 and/or a coupling portion coupling the channel portion to the connector tube portion 421.

Specifically, the coupling portion is constituted by two bar-like portions extending from left and right side walls of the channel portion toward the tip side. That is, the wire holding portion 422 is shaped such that the base end side is open upward of FIG. 4 and the tip side is open upward and downward of FIG. 4.

Tip parts of the coupling portion are connected or connectable to the outsides of the side walls of the connector tube portion 421.

The one or more tip parts of the coupling portion particularly serve as guide portions 422*a*. Specifically, the guide portions 422*a* are provided on the latera (left and/or right) side surface(s) of the connector tube portion 421. A tip part of the guide portion 422 particularly has a shape tapered toward a tip.

The cover portion 42B is fixed or fixable to the wire holding portion 422 to substantially close the openings of the wire holding portion 422.

The cover portion 42B at least partly covers connected parts of the wire barrel(s) 412 of the female terminal(s) 41 and the conductor(s) 110 of the communication cable 100 particularly by substantially closing the openings.

A partitioning portion 423 particularly is provided on the inner peripheral surface of the cover portion 42B. The partitioning portion 423 has a function of ensuring insulation between the two wires 100A and 100B by being arranged between the two wires 100A and 100B.

The body portion 42A and/or the cover portion 42B particularly are made of insulating resin such as polybutylene terephthalate (PBT).

«Female Shield Member»

As shown in FIGS. 5 and 6, the female shield member 43 is arranged on the outer periphery of the connector member 42. As shown in FIG. 3, the female shield member 43 particularly substantially has a tubular shape. In this example, a transverse cross-sectional shape of the female shield member 43 is elliptical. The transverse cross-section of the female shield member 43 is a cross-section cut by a plane orthogonal to an axial direction of the female shield member 43. An end surface 43*b* (FIG. 6) on the tip side of the female shield member 43 is substantially flush with an end surface on the tip side of the connector member 42.

The one or more insertion holes 421*h* (FIG. 4) of the connector member 42 are exposed from an opening on the tip side of the female shield member 43.

The female shield member 43 particularly substantially has a length from the tip(s) of the female terminal(s) 41 to the shield layer 140 of the communication cable 100.

The inner peripheral surface on the base end side of the female shield member 43 particularly substantially is in contact with (particularly the outer peripheral surface of) the electrically conductive rubber 93. The female shield member 43 particularly is electrically connected to the shield layer 140 (FIG. 4) via the electrically conductive rubber 93.

As shown in FIG. 5, the female shield member 43 includes at least one recess 431 in the outer peripheral surface thereof. The recess 431 of this example is provided in the lower surface of the female shield member 43. The recess 431 is so provided that at least one lance portion 511 provided on a first tube portion 51 of the housing 5 to be described later at least partly is or can be fit thereinto. The fitting of the recess 431 and the lance portion 511 is described later.

As shown in FIGS. 5 and 7, the at least one projection 437 is provided on the inner surface of the female shield member 43. With the female shield member 43 substantially arranged at a proper position on the outer periphery of the connector member 42, the projection 437 of the female shield member 43 particularly butts against the end surface of the inclined portion 421*p* of the connector member 42.

The female shield member 43 is preferably a cast body. Gaps are unlikely to be formed on the peripheral surface of the female shield member 43 constituted by the cast body. The peripheral surface of the female shield member 43 preferably has no hole open therein. The female shield member 43 of this example is constituted by the cast body and has no hole open in the peripheral surface thereof. The female shield member 43 constituted by the cast body is excellent in shielding performance.

A material of the female shield member 43 constituted by the cast body is not particularly limited as long as this material is a metal having a high electrical conductivity. For example, various pure metals or alloys excellent in electrical conductivity and strength can be suitably used as the material of the female shield member 43. Among these, zinc alloy is preferable. The female shield member 43 made of zinc alloy particularly is better in shielding performance than female shield members made of aluminum alloy in high-speed communication of 100 Mbps or faster. In a manufacturing process of the female shield member 43, molten zinc alloy easily spreads to narrow gaps of a mold due to a low viscosity. Thus, the small and thin female shield member 43 is easily obtained with good dimensional accuracy by using zinc alloy. Zinc alloy is suitable as the material of the female shield member 43 because of its inexpensiveness.

«Housing»

As shown in FIGS. 5 and 6, the housing 5 is arranged on or to the outer periphery of the female shield member 43.

As shown in FIG. 3, the housing 5 particularly substantially has a tubular shape. The housing 5 of this example particularly includes the first tube portion 51 and a second tube portion 52 arranged at a distance from each other as shown in FIGS. 3, 5 and 6. A part on a tip side of the first tube portion 51 is an inner tube and the second tube portion 52 is an outer tube. The first and second tube portions 51, 52 particularly constitute an integrated object.

As shown in FIGS. 5 and 6, the first tube portion 51 at least partly covers from an end part on the tip side of the female shield member 43 to an end part on the base end side of at least one water-stop rubber 92 mounted on the communication cable 100. In this example, the first tube portion 51 particularly substantially has an elliptical transverse cross-sectional shape in conformity with the shape of the female shield member 43.

The lance portion 511 particularly is provided on or near a tip portion 51*t* of the first tube portion 51 as shown in FIG. 5.

The tip portion 51*t* of the first tube portion 51 particularly is an end part of the first tube portion 51 on a side mainly covering the female shield member 43.

The lance portion 511 of this example is provided on the lower surface of the first tube portion 51.

The lance portion 511 particularly is a spring piece cantilevered and supported on the tip portion 51*t*. The lance portion 511 in a state not resiliently deformed includes a protrusion substantially projecting inwardly of the first tube portion 51.

The lance portion 511 particularly is provided to be at least partly fit into the recess 431 provided in the female shield member 43. By fitting the lance portion 511 into the recess 431, the female shield member 43 is held in the first tube portion 51.

The female connector module 4 particularly is assembled as follows. The one or more female terminals 41 are connected to the one or more respective conductors 110 of the communication cable 100.

The connector member 42 is mounted to at least partly cover the female terminals 41.

The female shield member 43 is mounted to at least partly cover the connector member 42.

The housing 5 is mounted to at least partly cover the female shield member 43.

The housing 5 particularly is mounted by at least partly inserting the female shield member 43 into the first tube portion 51 from the base end side of the first tube portion 51. During the insertion of the female shield member 43 into the first tube portion 51, the lance portion 511 substantially extends along the outer peripheral surface of the female shield member 43. When the female shield member 43 is arranged at a specified (predetermined or predeterminable) position in the first tube portion 51, the lance portion 511 at least partly is fit into the recess 431.

As shown in FIG. 6, the tip portion 51*t* of the first tube portion 51 particularly has one or more first holes 515 and/or one or more second holes 516. The first and/or second holes 515, 516 particularly substantially are provided on a straight line along an axis of the first tube portion 51.

The one or more first holes 515 are provided on or near the tip side of the first tube portion 51 and/or the one or more second holes 516 are provided on or near the base end side of the first tube portion 51. The first and second holes 515, 516 of this example are provided in left and right side walls of the first tube portion 51.

In this example, the first holes 515 and the second holes 516 are paired, and these pairs are provided at positions substantially facing each other in the first tube portion 51.

The first and/or second holes 515, 516 are so provided that one or more projections 625 of the front mask 6 to be described later at least partly are fit thereinto. The fitting of the first and/or second holes 515, 516 and the one or more projections 625 is described later.

The tip portion 51*t* of the first tube portion 51 particularly includes at least one inclined portion 513 tapered toward a tip as shown in FIG. 6.

As shown in FIGS. 5 and 6, the water-stop rubber 91 particularly is arranged on the outer periphery of the first tube portion 51. The water-stop rubber 91 particularly substantially has a tubular shape.

The water-stop rubber 91 is arranged on a central or intermediate side of the first tube portion 51. One or more annular lips projecting radially outwardly of the water-stop rubber 91 are provided on the outer periphery of the water-stop rubber 91.

The water-stop rubber 91 particularly suppresses the intrusion of water from between the housing 5 and the front mask 6 to be described later.

The second tube portion 52 is provided to at least partly cover a substantially intermediate part to the tip side of the first tube portion 51.

A transverse cross-sectional shape of the second tube portion 52 particularly is a combination of an elliptical part substantially in conformity with the shape of the first tube portion 51 and/or a rectangular part continuous with an upper side of the elliptical part.

A space is present between the first and second tube portions 51, 52. The housing 3 of the male connector to be described later at least partly is fit or fittable into this space.

«Front Mask»

As shown in FIGS. 5 and 6, the front mask 6 is provided on or near the tip portion 51*t* of the housing 5. As shown in FIG. 3, the front mask 6 particularly substantially is a (at least partly) bottomed tube-like member having an end wall 61 and/or one or more side walls 62. The front mask 6 is, for example, made of an insulating material such as a resin.

The end wall 61 of the front mask 6 particularly is a member substantially facing the end surface of the housing 5. As shown in FIGS. 5 and 6, the end wall 61 particularly has at least one through hole 610 into which the male terminal module 2 (FIG. 2) to be described later at least partly is inserted or insertable.

The through hole 610 particularly is shaped to substantially correspond to the outer peripheral shape of the male shield member 23 of the male terminal module 2.

The one or more side walls 62 of the front mask 6 particularly are parts for at least partly covering the outer peripheral surface of the tip portion 51*t* of the housing 5.

In this example, as shown in FIG. 3, four side walls 62 particularly are provided at intervals in a circumferential direction of the front mask 6. The respective four side walls 62 are provided on upper, lower, left and right sides of the front mask 6.

As shown in FIG. 5, a first step 621 and/or a second step 622 particularly are provided on the inner peripheral surface of the side wall 62 provided on the lateral (e.g. lower) side. The first and second steps 621, 622 particularly are provided substantially on a straight line along an axis of the front mask 6.

The first and/or second steps 621, 622 are formed by thinning the side wall 62 in a stepwise manner from a tip side toward a base end side. The first step 621 particularly is provided on the tip side of the front mask 6, and/or the second step 622 particularly is provided on the base end side of the front mask 6.

The first and second steps 621, 622 particularly are provided at positions substantially facing the lance portion 511 in the first tube portion 51.

A relationship of the first and/or second steps 621, 622 and the lance portion 511 is described later.

The front mask 6 includes one or more fixing portions for fixing the front mask 6 to the housing 5. The front mask 6 of this example includes the one or more projections 625 to be at least partly fit to the housing 5 as the fixing portions as shown in FIG. 6.

The one or more projections 625 particularly are provided on the inner peripheral surfaces of the lateral (e.g. left and/or right) side wall(s) 62. In this example, the projections 625 are provided at positions substantially facing each other on the lateral (left and right) side walls 62 of the front mask 6.

The projections 625 particularly are provided at positions facing the second holes 516 in the first tube portion 51.

In assembling the female connector module 4, the female shield member 43 at least partly is inserted into the first tube portion 51 from the base end side of the first tube portion 51 as described above. At this time, as shown in FIGS. 7 and 8, the first tube portion 51 and the front mask 6 are in a partially locked state.

Specifically, as shown in FIG. 8, the projection(s) 625 of the front mask 6 at least partly are fit in the first hole(s) 515 of the first tube portion 51. Note that FIG. 7 shows the female shield member 43 being at least partly inserted into the first tube portion 51 in the partially locked state.

In FIG. 7, the female shield member 43 is not completely inserted and the lance portion 511 is not fit in the recess 431. FIG. 8 shows a state after the female shield member 43 is completely inserted into the first tube portion 51 in the partially locked state. Although not shown in FIG. 8, the lance portion 511 is fit in the recess 431 (see FIG. 5).

If the female shield member 43 is incompletely inserted in the partially locked state, the tip part of the female shield member 43 is substantially facing a region of the front mask 6 closer to the base end side than the second step 622 as shown in FIG. 7. Thus, in inserting the female shield member 43 into the first tube portion 51, the lance portion 511 is displaceable radially outwardly of the first tube portion 51 along a part where the recess 43 is not provided, out of the outer peripheral surface of the female shield member 43.

If the lance portion 511 pushes the front mask 6 toward the base end side while being displaced radially outwardly of the first tube portion 51, the end surface 511*b* of the lance portion 511 substantially butts against the second step 622. In this case, even if the front mask 6 is pushed toward the base end side, the projections 625 cannot be fit into the first holes 515.

In other words, if the female shield member 43 is incompletely inserted, the end surface 511*b* of the lance portion 511 butts against the second step 622, wherefore the front mask 6 cannot be completely pushed to the base end side.

Thus, the front mask 6 particularly has a function of detecting incomplete insertion of the female shield member 43 by the second step 622.

If the female shield member 43 is completely or properly inserted in the partially locked state, the lance portion 511 at least partly is fit in the recess 431 provided in the female shield member 43 and displaced radially inwardly of the first tube portion 51 as shown in FIG. 5.

If the front mask 6 is pushed to the base end side in this state, the end surface 511*b* of the lance portion 511 substantially butts against the first step 621 without butting against the second step 622.

At this time, as shown in FIG. 6, the projection(s) 625 is/are at least partly fit into the second hole(s) 516. A state where the projection(s) 625 is/are fit in the second hole(s) 516 is a fully locked state.

In the fully locked state, the end surface 43*b* of the female shield member 43 particularly is pressed against the electrically conductive rubber 7 to be described later as shown in FIGS. 5 and 6.

In the fully locked state, the front mask 6 at least partly is inserted to a proper position between the first and second tube portions 51, 52. In this state, the end surface of the front mask 6 particularly substantially butts against the water-stop rubber 91.

Thus, the front mask 6 particularly (also) has a function of preventing the detachment of the water-stop rubber 91. A water-stop effect is easily enhanced if the end surface of the front mask 6 butts against the water-stop rubber 91 to compress the water-stop rubber 91 in the axial direction.

The front mask 6 and the female shield member 43 particularly satisfy a relationship of $L2<L3$. L2 denotes a distance between the inner surfaces on the tip sides of the second holes 516 and the end surface 43*b* of the female shield member 43 with the female shield member 43 completely or properly inserted in the first tube portion 51 as shown in FIG. 8.

L3 denotes a distance between the end surfaces on the tip sides of the projections 625 and an inner surface 61*a* of the end wall 61 as shown in FIG. 8.

The inner surface 61*a* of the end wall 61 particularly is a surface of the end wall 61 facing the female shield member 43.

By satisfying L2<L3, the projection(s) 625 particularly is/are fit into the second hole(s) 516 with the front mask 6 completely or properly inserted to the proper position between the first and second tube portions 51, 52.

The side walls 62 particularly may be a tubular side wall substantially continuously provided in the circumferential direction of the front mask 6.

«Electrically Conductive Rubber»

As shown in FIGS. 5 and 6, the electrically conductive rubber 7 particularly at least partly is arranged inside the through hole 610 provided in the end wall 61 of the front mask 6.

The electrically conductive rubber 7 particularly has a substantially tubular shape substantially corresponding to the inner peripheral shape of the through hole 610.

The electrically conductive rubber 7 specifically ensures or provides conduction between the female shield member 43 and the male shield member 23 of the male terminal module 2 to be described later.

As shown in FIG. 11, the electrically conductive rubber 7 is provided in contact with the end surface 43*b* of the female shield member 43 while being held in contact with an outer peripheral surface 23*a* of the male shield member 23.

The electrically conductive rubber 7 is resiliently deformed or deformable. By this resilient deformation, the electrically conductive rubber 7 and the outer peripheral surface 23*a* of the male shield member 23 particularly are held substantially in close contact and the electrically conductive rubber 7 and/or the end surface 43*b* of the female shield member 43 are held in close contact.

In this example, the end surface 43*b* of the female shield member 43 is pressed against the electrically conductive rubber 7.

The electrically conductive rubber 7 particularly is made of a composite material in which an electrically conductive filler is dispersed in a rubber material. Natural rubber, synthetic rubber and the like can be, for example, cited as the rubber material. Carbon, metal and the like can be cited as a material of the electrically conductive filler.

The electrically conductive rubber 7 and the front mask 6 particularly satisfy a relationship of L1£L2. L1 denotes a distance between the end surfaces on the tip sides of the projections 625 and the end surface on the base end side of the electrically conductive rubber 7 in a non-compressed state as shown in FIG. 8.

By satisfying L1£L2, the electrically conductive rubber 7 particularly contacts the end surface 43*b* of the female shield member 43 if the front mask 6 provided with the electrically conductive rubber 7 is pushed to the proper position in the first tube portion 51. L1<L2 is preferable.

By satisfying L1<L2, the electrically conductive rubber 7 particularly is resiliently deformed to be pressed against the end surface 43*b* of the female shield member 43.

The electrically conductive rubber 7 is preferably an injection molded body formed integrally to the front mask 6. In this case, the front mask 6 and the electrically conductive rubber 7 can be handled as an integrated object.

The electrically conductive rubber 7 can be, for example, formed by two-color molding in the through hole 610 provided in the end wall 61 of the front mask 6 when the front mask 6 is molded using a mold.

The electrically conductive rubber 7 of this example is provided to at least partly cover a peripheral region of an opening edge part 611 of the through hole 610 on the inner surface 61*a* of the end wall 61 as shown in FIG. 11.

In the female shield member 43 of this example, the end surface 43*b* in a region located on a lateral (upper) side is distant from the inner peripheral surface of the through hole 610 in a radial direction of the through hole 610.

The electrically conductive rubber 7 particularly is arranged to substantially face the entire circumferential region of the end surface 43*b*. The electrically conductive rubber 7 of this example is arranged from the opening edge part 611 of the through hole 610 in the inner surface 61*a* of the end wall 61 to the inner surface 61*a*. In the electrically conductive rubber 7 of this example, a region located on the side of the inner surface 61*a* of the end wall 61 particularly is vertically asymmetrical in conformity with the position of the end surface 43*b*. In the electrically conductive rubber 7 of this example, the region located on the upper side projects more radially outwardly of the electrically conductive rubber 7 than a region located on a lower side.

By providing the electrically conductive rubber 7 up to the inner surface 61*a* of the end wall 61, the electrically conductive rubber 7 easily contacts the end surface 43*b* of the female shield member 43.

As shown in FIG. 11, the electrically conductive rubber 7 of this example is provided to at least partly cover a peripheral region of the opening edge part 611 of the through hole 610 on an outer surface 61*b* of the end wall 61. The outer surface 61*b* of the end wall 61 particularly is a surface of the end wall 61 substantially facing the male connector to be described later.

By particularly providing the electrically conductive rubber 7 from the inner surface 61*a* of the end wall 61 to the outer surface 61*b* via the inner peripheral surface constituting the through hole 610, an axial length of the electrically conductive rubber 7 is or can be easily secured and/or a contact area of the electrically conductive rubber 7 and the male shield member 23 is or can be easily secured.

<Male Terminal Module>

As shown in FIG. 9, the male terminal module 2 includes the male terminals 21, a dielectric 22 and the male shield member 23.

«Male Terminals»

The male terminal 21 is a terminal for communication in which a communication signal is transmitted. The male terminal module 2 of this example includes one or more (e.g. two) male terminals 21.

A pair of the male terminals 21 particularly are arranged apart from each other.

The male terminal 21 particularly has a substantially bar-like shape. The male terminal 21 of this example is bent into an L shape.

The male terminal 21 is to be connected to the female terminal 41 of the female connector module 4.

In this example, one or more ground terminals 212 particularly are arranged substantially side by side with the respective male terminal(s) 21.

The one or more ground terminals 212 particularly have a function of suppressing noise leaking from the male terminals 21 for signal. In this example, a pair of the ground terminals 212 are arranged across the pair of male terminals 21.

«Male Shield Member»

The male shield member 23 particularly is arranged on the outer periphery/peripheries of the male terminal(s)s 21. The male shield member 23 has shielding performance to shield noise leaking from the male terminals 21.

The male shield member 23 particularly has a substantially tubular shape.

Outside dimensions of a transverse cross-section of the male shield member 23 particularly are larger than inside dimensions of the electrically conductive rubber 7 in a non-compressed state. If the male shield member 23 is inserted inside the electrically conductive rubber 7, the electrically conductive rubber 7 particularly is resiliently deformed. By this resilient deformation, the electrically conductive rubber 7 is held in close contact with the outer peripheral surface 23*a* of the male shield member 23.

The male shield member 23 particularly collectively covers around the one or more (e.g. the pair of) male terminals 21. The male shield member 23 of this example is bent into an L shape to substantially correspond to the bent shape of the male terminals 21. The male shield member 23 of this example also collectively covers around the pair of ground terminals 212.

Both end parts of each male terminal 21 and one end part of each ground terminal 212 particularly are exposed from the male shield member 23.

The male shield member 23 is preferably a cast body. Gaps are unlikely to be formed on the peripheral surface of the male shield member 23 constituted by the cast body. The peripheral surface of the male shield member 23 preferably has no hole open therein.

The male shield member 23 of this example is constituted by the cast body and has no hole open in the peripheral surface thereof. The male shield member 23 constituted by the cast body is excellent in shielding performance. Zinc alloy is preferable as a material of the male shield member 23 constituted by the cast body, similarly to the female shield member 43 described above.

Besides, the male shield member 23 particularly can also be made of a composite material at least partly having at least one plating layer on a surface of a resin material.

The resin material particularly is the dielectric 22 to be described later.

The plating layer is not shown. Tin and nickel can be cited as a material of the plating layer.

The male shield member 23 particularly can also be made of an electrically conductive resin material. A composite material in which an electrically conductive filler is dispersed in a resin material can be cited as the electrically conductive resin material. Polybutylene terephthalate (PBT) and the like can be cited as a material of the resin material. Carbon, metal and the like can be cited as a material of the electrically conductive filler.

Figure 10:
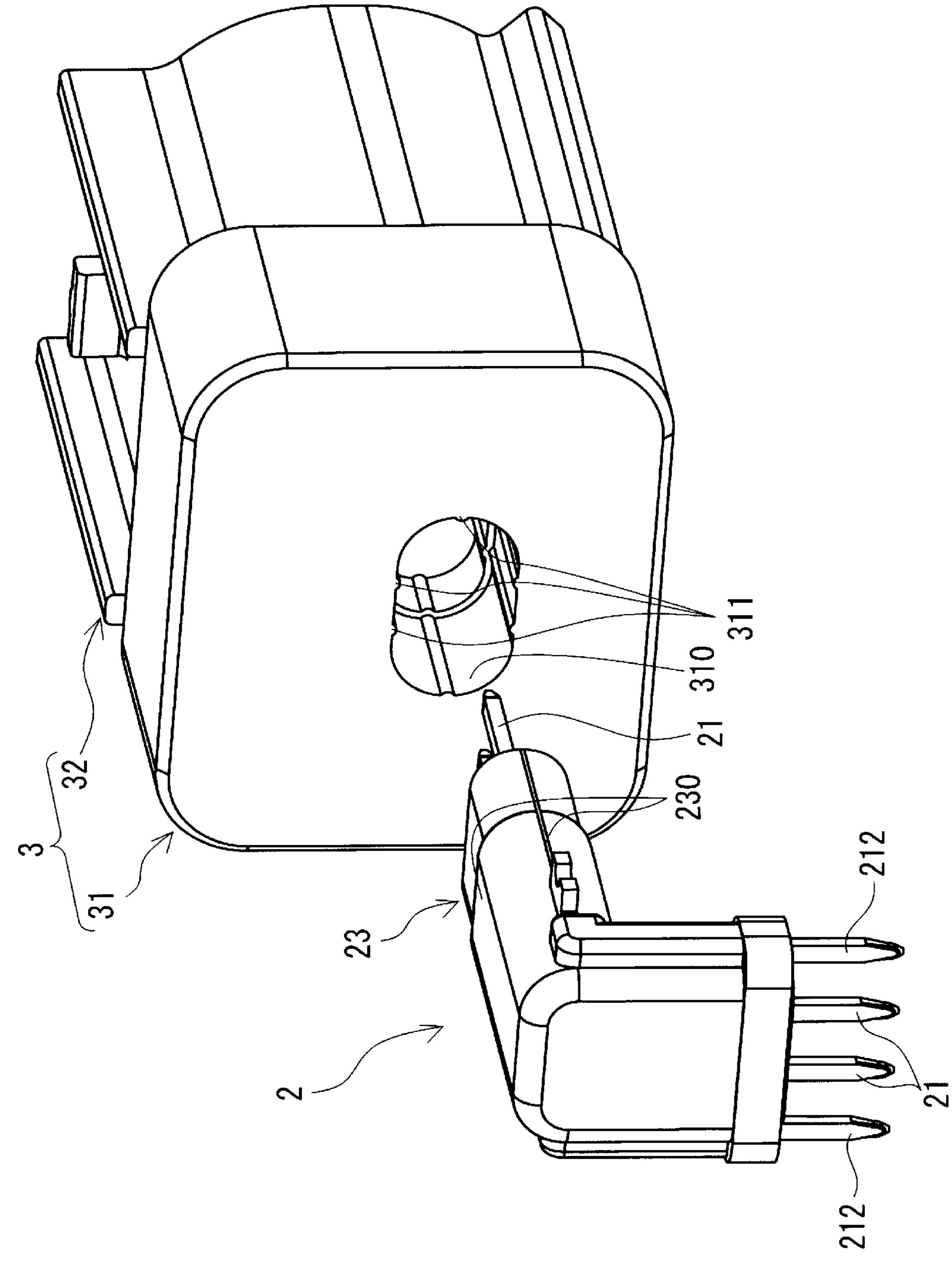
FIG. 10 is a schematic exploded perspective view of a male connector provided with the male terminal module in the connector assembly of the embodiment.

As shown in FIG. 10, one or more flat surface portions 230 particularly are provided on the outer peripheral surface 23*a* of the male shield member 23.

A plurality of the flat surface portions 230 particularly are provided along a circumferential direction of the male shield member 23.

The flat surface portions 230 particularly are provided at positions of the male shield member 23 substantially facing each other. In this example, the flat surface portions 230 are provided on upper, lower, left and right sides of the male shield member 23.

Extension surfaces of the adjacent flat surface portions 230 are arranged at an angle different from 0 or 180 degrees, particularly substantially orthogonal to each other. Projection(s) 311 in the housing 3 to be described later particularly contact(s) the respective flat surface portion(s) 230.

«Dielectric»

As shown in FIG. 9, the dielectric 22 particularly at least partly is arranged between the male terminal(s) 21 and the male shield member 23. The dielectric 22 ensures electrical insulation between the one or more male terminals 21 and/or the male shield member 23.

The dielectric 22 particularly is designed to match characteristic impedance at a frequency of communication signals transmitted to the male terminal(s) 21.

The dielectric 22 particularly is (also) arranged between the pair of male terminals 21, between the male terminal(s) 21 and the ground terminal(s) 212 and/or between the ground terminal(s) 212 and the male shield member 23.

<Male Connector>

The male connector particularly is constituted by or comprises the male terminal module 2 and the housing 3. The housing 3 at least partly covers (particularly a tip part of) the male terminal module 2 as shown in FIG. 1. The tip part of the male terminal module 2 particularly is an end part of the male terminal module 2 on a side to be connected to the female connector module 4.

«Housing»

As shown in FIGS. 2 and 10, the housing 3 particularly includes a base end portion 31 and a tip portion 32. The base end portion 31 and the tip portion 32 particularly constitute an integrated object.

The base end portion 31 particularly is a part to be fixed to the tip part of the male terminal module 2.

The base end portion 31 particularly is provided with at least one through hole 310. The through hole 310 is shaped to substantially correspond to the outer peripheral shape of the male shield member 23.

As shown in FIG. 10, one or more, particularly a plurality of the projections 311 are provided on the inner peripheral surface of the through hole 310. The projections 311 particularly are provided on surfaces, which will substantially face the flat surface portions 230 of the male shield member 23.

If the male terminal module 2 at least partly is inserted into the through hole 310, the one or more projections 311 contact and are pressed against the flat surface portions 230. By this contact, the male terminal module 2 particularly is fixed to the housing 3.

The tip portion 32 particularly is a part to be assembled with the housing 5 of the female connector module 4. The tip portion 32 of this example at least partly is inserted between the first and second tube portions 51, 52 in the housing 5.

<Conduction Between Female Shield Member and Male Shield Member>

With the female connector module 4 and the male terminal module 2 connected, the end surface 43*b* of the female shield member 43 particularly substantially is in contact with the electrically conductive rubber 7 and/or the outer peripheral surface 23*a* of the male shield member 23 is in contact with the electrically conductive rubber 7 as shown in FIG. 11. That is, conduction between the female shield member 43 and the male shield member 23 particularly is ensured by the electrically conductive rubber 7.

Effects of Embodiment

The female connector module 4 and the connector assembly 1 of the embodiment can ensure conduction between the female shield member 43 and the male shield member 23 by the electrically conductive rubber 7 particularly by inserting the male terminal module 2 into (particularly the through hole 610 of) the front mask 6.

By fitting the one or more projections 625 provided on the housing 5 and the one or more second holes 516 provided in the front mask 6, the end surface 43*b* of the female shield member 43 particularly is pressed against the electrically conductive rubber 7, wherefore the conduction can be satisfactorily ensured.

The electrically conductive rubber 7 particularly is arranged inside the through hole 610 and has a simple configuration. Particularly, since the electrically conductive rubber 7 is an article integrally molded to the front mask 6 e.g. by two-color molding, the electrically conductive rubber 7 is also easily handled. Due to a simple configuration, high-level working in the manufacturing process is unnecessary.

The front mask 6 particularly has the function of detecting the incomplete insertion of the female shield member 43 and/or the function of preventing the detachment of the water-stop rubber 91.

Since the front mask 6 particularly having these functions is provided with the electrically conductive rubber 7, one member can have different functions and an increase in the number of components can be suppressed.

Since the conduction particularly is ensured by the electrically conductive rubber 7 in the female connector module 4 and the connector assembly 1 of the embodiment, it is not necessary to form each of the female shield member 43 and the male shield member 23 into a pressed article and/or provide a spring mechanism in the pressed article. Thus, the female shield member 43 and the male shield member 23 can be, for example, constituted by cast bodies. Since gaps are unlikely to be formed on the peripheral surfaces of the female shield member 43 and the male shield member 23 particularly constituted by cast bodies, shielding performance is excellent.

In the female connector module 4 and the connector assembly 1 of the embodiment, the entire periphery of the electrically conductive rubber 7 particularly serves as a contact region with the male shield member 23. Thus, a shield current can be more efficiently sent or conducted between the male shield member 23 and the electrically conductive rubber 7 and high shielding performance can be ensured.

Accordingly, in order to ensure conduction between a male shield member and a female shield member by a simple configuration, there is provided a female connector module to be connected to a male terminal module is provided with a tubular female shield member, a tubular housing arranged on an outer periphery of the female shield member, a front mask provided on a tip portion of the housing, and an electrically conductive rubber for conduction between a male shield member of the male terminal module and the female shield member. The front mask has an end wall for facing an end surface of the housing and a side wall for covering an outer peripheral surface of the tip portion. The end wall has a through hole into which the male terminal module being inserted. The electrically conductive rubber is so arranged inside the through hole as to contact an end surface of the female shield member while being held in contact with an outer peripheral surface of the male shield member.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A female connector module to be connected to a male terminal module, comprising:
- a female shield member;
- a housing arranged on an outer periphery of the female shield member;
- a front mask provided on a tip portion of the housing; and
- an electrically conductive rubber for conduction between a male shield member of the male terminal module and the female shield member, wherein:
- the front mask has an end wall for substantially facing an end surface of the housing and at least one side wall for at least partly covering an outer peripheral surface of the tip portion,
- the end wall has a through hole, the male terminal module being insertable into the through hole, and
- the electrically conductive rubber at least partly is so arranged inside the through hole as to contact the female shield member while being held in contact with the male shield member.

2. The female connector module according to claim 1, wherein the electrically conductive rubber at least partly is so arranged inside the through hole as to contact an end surface of the female shield member while being held in contact with an outer peripheral surface of the male shield member.

3. The female connector module according to claim 1, wherein the female shield member is a substantially tubular female shield member and/or wherein the housing is a tubular housing.

4. The female connector module according to claim 1, wherein the female shield member is a cast body.

5. The female connector module according to claim 1, wherein the front mask includes at least one fixing portion for fixing the front mask to the housing with the end surface of the female shield member pressed against the electrically conductive rubber.

6. The female connector module according to claim 5, wherein the fixing portion includes at least one projection to be fit to the housing.

7. The female connector module according to claim 1, wherein the electrically conductive rubber comprises an injection molded body configured integrally to the front mask.

8. The female connector module according to claim 1, wherein the electrically conductive rubber is arranged to at least partly cover a peripheral region of an opening edge part of the through hole on an inner surface of the end wall and a peripheral region of the opening edge part of the through hole on an outer surface of the end wall.

9. A connector assembly, comprising:
- a male terminal module; and
- a female connector module to be connected to the male terminal module, wherein:
- the male terminal module includes a male shield member, and
- the female connector module is a female connector module according to claim 1.

10. The connector assembly according to claim 9, wherein the male shield member comprises a composite material having a plating layer on a surface of a resin material, an electrically conductive resin material and/or a cast body.

* * * * *